(12) United States Patent
Parker et al.

(10) Patent No.: US 10,733,111 B2
(45) Date of Patent: Aug. 4, 2020

(54) MEMORY MANAGEMENT

(71) Applicant: ARM LIMITED, Cambridge (GB)

(72) Inventors: Jason Parker, Sheffield (GB); Andrew Brookfield Swaine, Sheffield (GB)

(73) Assignee: ARM Limited, Cambridge (GB)

( * ) Notice: Subject to any disclaimer, the term of this patent is extended or adjusted under 35 U.S.C. 154(b) by 8 days.

(21) Appl. No.: 15/831,635

(22) Filed: Dec. 5, 2017

(65) Prior Publication Data

US 2018/0165218 A1  Jun. 14, 2018

(30) Foreign Application Priority Data

Dec. 9, 2016  (GB) .................................. 1620954.6

(51) Int. Cl.
*G06F 12/1027* (2016.01)
*G06F 12/0817* (2016.01)
*G06F 12/14* (2006.01)
*G06F 12/1009* (2016.01)

(52) U.S. Cl.
CPC ...... *G06F 12/1027* (2013.01); *G06F 12/0828* (2013.01); *G06F 12/1009* (2013.01); *G06F 12/1416* (2013.01); *G06F 12/1425* (2013.01); *G06F 2212/1032* (2013.01); *G06F 2212/1052* (2013.01); *G06F 2212/65* (2013.01)

(58) Field of Classification Search
CPC ...... G06F 12/10; G06F 12/14; G06F 12/1425; G06F 12/1491; G06F 12/1027; G06F 12/1036; G06F 12/0828; G06F 12/1416; G06F 12/145; G06F 12/1009; G06F 12/0831

USPC ........................................................ 711/206
See application file for complete search history.

(56) References Cited

U.S. PATENT DOCUMENTS

| 5,390,310 | A | | 2/1995 | Welland |
| 5,627,987 | A | * | 5/1997 | Nozue ................ G06F 12/1458 711/200 |
| 8,645,666 | B2 | * | 2/2014 | Glew ................ G06F 12/1027 711/207 |
| 2015/0356029 | A1 | | 12/2015 | Craske et al. |

(Continued)

OTHER PUBLICATIONS

Combined Search and Examination Report for GB1620954.6 dated May 17, 2017, 6 pages.

*Primary Examiner* — Pierre Miche Bataille
(74) *Attorney, Agent, or Firm* — Nixon & Vanderhye P.C.

(57) ABSTRACT

Apparatus comprises input circuitry to receive a translation request defining an input memory address within an input memory address space; and address translation circuitry comprising: permission circuitry to detect whether memory access is permitted for the input memory address with reference to permission data populated from address translation tables and stored in a permission data store for each of a set of respective regions of the input memory address space, there being a dedicated entry in the permission data store for each of the regions so that the input memory address maps to a single respective entry; and output circuitry to provide an output memory address in response to the translation request, in which when the permission circuitry indicates that access is permitted to a region of the input memory address space including the input memory address, the output circuitry is configured to provide the output memory address as a predetermined function of the input memory address.

15 Claims, 12 Drawing Sheets

(56) References Cited

U.S. PATENT DOCUMENTS

2015/0370727 A1* 12/2015 Hashimoto ............. G06F 21/64
                                                                711/163
2017/0075817 A1    3/2017  Gove
2018/0067866 A1*  3/2018  Shanbhogue ....... G06F 9/45558

* cited by examiner

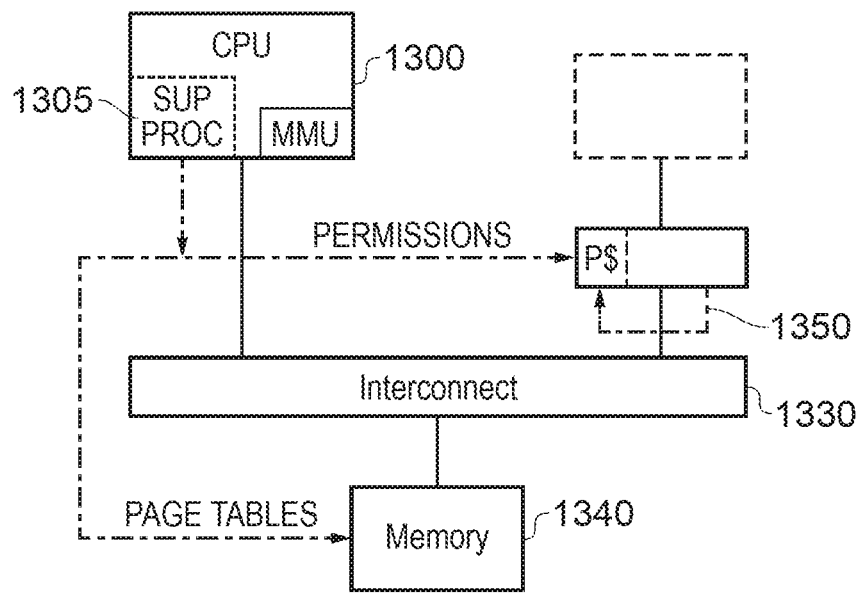
FIG. 13
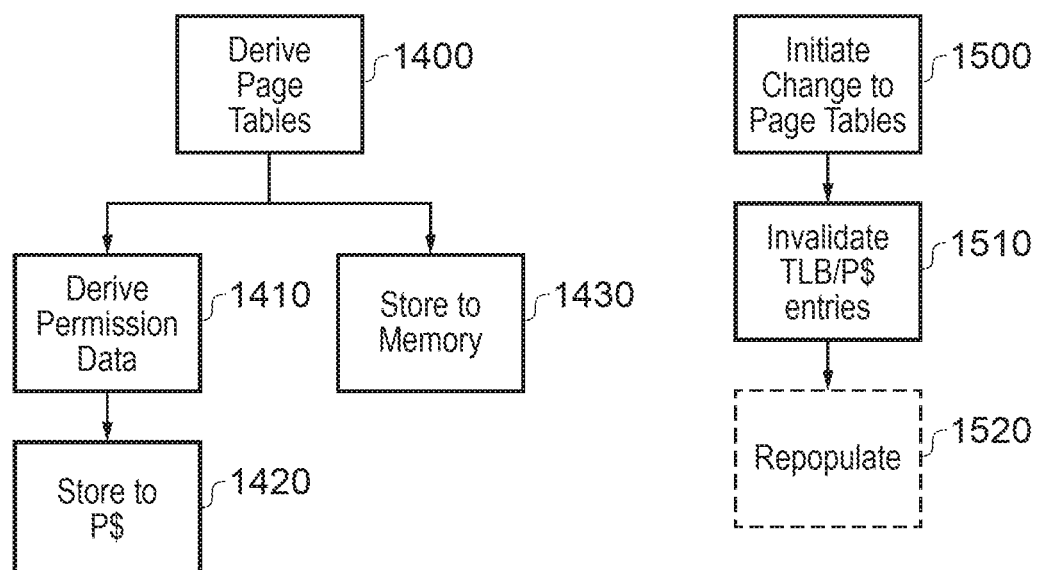
FIG. 14
FIG. 15

MEMORY MANAGEMENT

This application claims priority to GB Patent Application No. 1620954.6 filed Dec. 9, 2016, the entire contents of which are hereby incorporated by reference.

BACKGROUND

This disclosure relates to memory management.

A data processing apparatus may provide each running program or peripheral device with access to a virtual address space defined by virtual memory addresses. Each program or device sees its own virtual address space which contains instructions and data for use by that program or device. Amongst other established advantages, the use of virtual addressing allows the operating system to control memory access by inhibiting one program from accessing or corrupting information used by another program.

When an access is required to a virtual memory address, it is first necessary to translate the virtual memory address to a physical memory address so that the required information can be obtained from or written to the physical memory or a physical memory cache.

A cache known as a translation lookaside buffer (TLB) may be used as part of the address translation process. The TLB stores recently or commonly used translations between virtual and physical memory addresses. So, as a first step in an address translation process, a TLB may be consulted to detect whether the TLB already contains the required address translation. If not, then a more involved translation process may be used, for example involving consulting so-called page tables holding address translation information, typically resulting in the TLB being populated with the required translation.

Multiple stage translation is used in some situations. In examples, two levels of translation are used. A virtual address (VA) required by an executing program or other system module such as a graphics processing unit (GPU) is translated to an intermediate physical address (IPA) by a first translation stage. The IPA is translated to a physical address (PA) by a second translation stage. One reason why multiple stage translation is used is for security of information handling when multiple operating systems (OS) may be in use on respective "virtual machines" running on the same processor. A particular OS is exposed to the VA to IPA translation, whereas only a hypervisor (software which oversees the running of the virtual machines) or other supervisory process has oversight of the stage 2 (IPA to PA) translation.

SUMMARY

In an example arrangement there is provided apparatus comprising:

input circuitry to receive a translation request defining an input memory address within an input memory address space; and address translation circuitry comprising:

permission circuitry to detect whether memory access is permitted for the input memory address with reference to permission data populated from address translation tables and stored in a permission data store for each of a set of respective regions of the input memory address space, there being a dedicated entry in the permission data store for each of the regions so that the input memory address maps to a single respective entry; and output circuitry to provide an output memory address in response to the translation request, in which when the permission circuitry indicates that access is permitted to a region of the input memory address space including the input memory address, the output circuitry is configured to provide the output memory address as a predetermined function of the input memory address.

In another example arrangement there is provided a method comprising:

receiving a translation request defining an input memory address within an input memory address space;

detecting whether memory access is permitted for the input memory address with reference to permission data populated from address translation tables and stored in a permission data store for each of a set of respective regions of the input memory address space, there being a dedicated entry in the permission data store for each of the regions so that the input memory address maps to a single respective entry; and providing an output memory address in response to the translation request, in which when the permission circuitry indicates that access is permitted to a region of the input memory address space including the input memory address, the output circuitry is configured to provide the output memory address as a predetermined function of the input memory address.

Further respective aspects and features of the present technology are defined by the appended claims.

BRIEF DESCRIPTION OF THE DRAWINGS

The present technique will be described further, by way of example only, with reference to embodiments thereof as illustrated in the accompanying drawings, in which:

FIG. 13 schematically illustrates a data processing apparatus;

FIG. 14 is a schematic flowchart illustrating the populating of pages tables and permission information;

FIG. 15 is a schematic flowchart illustrating the processing of a change to a page table;

DESCRIPTION OF EMBODIMENTS

Figure 1:
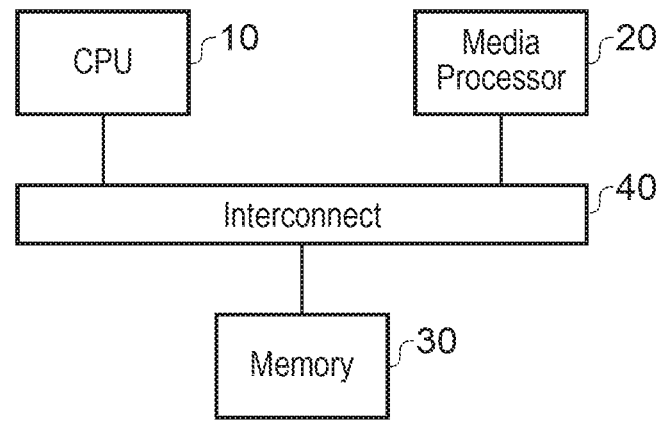
FIG. 1 schematically illustrates a data processing apparatus.

Before discussing the embodiments with reference to the accompanying figures, the following description of embodiments is provided.

An example embodiment provides apparatus comprising:

input circuitry to receive a translation request defining an input memory address within an input memory address space; and address translation circuitry comprising:

permission circuitry to detect whether memory access is permitted for the input memory address with reference to permission data populated from address translation tables and stored in a permission data store for each of a set of respective regions of the input memory address space, there being a dedicated entry in the permission data store for each of the regions so that the input memory address maps to a single respective entry; and output circuitry to provide an output memory address in response to the translation request, in which when the permission circuitry indicates that access is permitted to a region of the input memory address space including the input memory address, the output circuitry is configured to provide the output memory address as a predetermined function of the input memory address.

Example embodiments can provide aspects of the functionality of memory management (such as address translation) along with aspects of memory protection, and in examples these functions can be provided in the input address domain (such as a virtual address domain). By storing permission data relating to regions or blocks of memory addresses using a mapping between entries and regions, and by using a predetermined function for the address translation, these functions can be provided in the input (e.g. virtual) address domain using a potentially compact amount of storage which is potentially capable of being physically situated near to the device originating the translation requests.

Although the permission data could relate to a subset of the available input memory address space, in examples the permission circuitry is configured to store permission data for a set of contiguous regions of the input memory address space, such that each possible input memory address of the input memory address space is within a respective one of the regions.

In the event that the permission circuitry does not provide permission data relating to a memory address, a further level of address translation can be used. In examples, the apparatus comprises second translation circuitry to generate a translation of an input memory address to an output memory address; in which, when the permission circuitry does not indicate that access is permitted to a region of the input memory address space including the input memory address, the output circuitry is configured to provide a translation generated by the second translation circuitry. In examples, the second translation circuitry is configured to perform address translation with reference to the address translation tables. In examples, the second translation circuitry comprises: a translation lookaside buffer to store translations in respect of a subset of input memory addresses in the input memory address space; and circuitry to access the address translation tables to obtain a translation of an input memory address for which a translation is not stored by the translation lookaside buffer.

In examples, the address translation tables comprise a hierarchy of two or more page table levels, in which a page table in a higher level indicates, for a block of input memory addresses having a block size associated with that page table level, either: a respective one of a set or two or more page tables in a next level; or an address mapping applicable to that block of input memory addresses. Conveniently, in examples the regions have a region size equal to the block size associated with one of the page table levels other than a lowest page table level in the hierarchy of page table levels.

An example technique for conveniently updating the permission circuitry is one which: when the second translation circuitry generates a translation of an input memory address to an output memory address, the permission circuitry is configured to store permission data for that region of the input memory address space dependent upon the generated translation provided that the translation meets a set of criteria comprising: the translation is valid across the whole of one of the regions of the input memory address space; and the translation is such that output memory addresses are related by the predetermined function to input memory addresses within the region. Optionally, the set of criteria may also comprise: the translation grants access permissions which correspond to access permissions which can be stored by the permission circuitry.

Example arrangements provide a supervising processor to control storage of the address translation tables and to write permission data to the permission circuitry in dependence upon the address translation tables.

In examples, the input memory address is one of a physical address and a virtual memory address, and the output memory address is a physical memory address.

Although various functions can be used, in examples the predetermined function is such that the output memory address is equal to the input memory address. However, in other examples a choice of predetermined functions can be provided, in which:

the permission circuitry is configured to store data identifying the predetermined function.

An example arrangement also concerns data processing apparatus comprising:

one or more memories accessible according to physical memory addresses;

one or more data processing nodes to generate translation requests from a virtual memory address generated by that data processing node to a physical memory address to access the one or more memories; and address translation apparatus comprising apparatus as defined above to translate a virtual address from a data processing node to a physical address to access the one or more memories.

In examples (such as examples in which the predetermined function represents equality) the one or more data processing nodes have respective associated cache storage; the data processing apparatus comprises coherency control circuitry; and the one or more memories and the cache storage are configured to operate under the control of the coherency control circuitry to store one or more copies of data accessible by each of the data processing nodes, so that data written to a memory address in the coherent memory circuitry by one processing element is consistent with data read from that memory address in the coherent memory circuitry by another of the processing elements. The coherency control circuitry may be configured to communicate with the cache storage in respect of data held by the cache storage using a physical memory address by which that data is stored in the one or more memories. This arrangement allows coherent techniques to be used with the address translation techniques discussed above.

Another example embodiment provides a method comprising:

receiving a translation request defining an input memory address within an input memory address space;

detecting whether memory access is permitted for the input memory address with reference to permission data populated from address translation tables and stored in a permission data store for each of a set of respective regions of the input memory address space, there being a dedicated entry in the permission data store for each of the regions so that the input memory address maps to a single respective entry; and providing an output memory address in response to the translation request, in which when the permission circuitry indicates that access is permitted to a region of the input memory address space including the input memory address, the output circuitry is configured to provide the output memory address as a predetermined function of the input memory address.

Referring now to the drawings, FIG. 1 schematically illustrates a data processing apparatus comprising a processor core ("CPU" or central processing unit) 10, a media processor 20 such as a graphics processing unit (GPU) or display processor, and a memory 30, all connected to one another by an interconnect 40. The CPU 10 and the media processor 20 are examples of data processing nodes. It will be appreciated that the arrangement of FIG. 1 is a simplified example for the purpose of the present discussion and that other nodes, memories (such as cache memories), peripherals or other devices or circuitry may be included in the data processing apparatus.

Two aspects of managing access to the memory 30 will now be discussed. (A third, data coherency, will be discussed below with reference to FIG. 19). These are the use of address translation and the use of memory protection. Neither arrangement is shown explicitly in FIG. 1, for clarity of this initial diagram, but examples including these aspects of functionality will be discussed in detail below.

Regarding address translation, as mentioned above, each running program or peripheral device may be provided with access to a virtual address space defined by virtual memory addresses, so that each program or device sees its own virtual address space which contains instructions and data for use by that program or device. When an access is required to a virtual memory address, it is first necessary to translate the virtual memory address to a physical memory address so that the required information can be obtained from or written to the physical memory or a physical memory cache.

Although single stage translation from a virtual address to a physical address may be used, multiple stage translation is used in some situations. In some examples, two levels of translation are used. A virtual address (VA) required by an executing program or other system module such as a graphics processing unit (GPU) is translated to an intermediate physical address (IPA) by a first translation stage. The IPA is translated to a physical address (PA) by a second translation stage.

Address translation can be used in respect of accesses originating at each data processing node or other connected device to the memory 30.

Another aspect is that of memory protection. Memory protection can be used to police access to portions of the memory address space. For example, a memory protection unit (MPU) could be disposed between the interconnect 40 and the memory 30. The MPU would compare a memory address corresponding to each memory access transaction, and in some examples an identifier (ID) indicating an aspect of the provenance of the transaction (for example, indicating a level of trust associated with a program or device which issued the transaction) to detect whether permission is granted for that memory access transaction to take place.

This type of MPU (disposed between the interconnect and the memory) provides a so-called slave side memory protection in the physical address domain, in that the data processing nodes 10, 20 are considered as master devices (at least, as regards the initiation of memory access transactions) from the point of view of the interconnect 40, and the memory is considered to be a slave side device from the point of view of the interconnect 40.

Example arrangements to be discussed below can provide master-side memory protection as part of their functionality.

Figure 2:
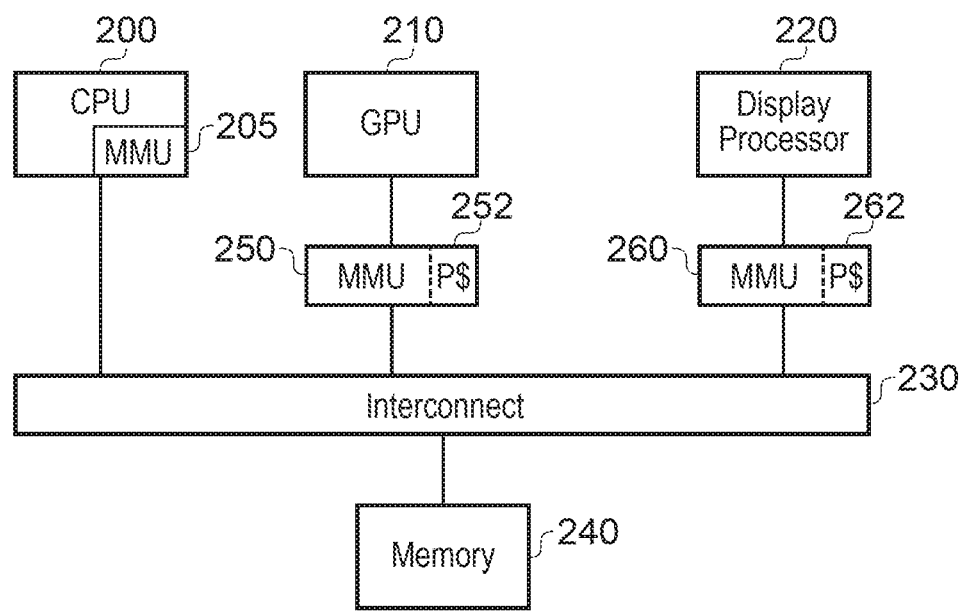
FIG. 2 schematically illustrates a data processing apparatus.

FIG. 2 schematically illustrates a data processing apparatus. In some respects this is similar to the apparatus shown in the high level diagram of FIG. 1, but this diagram also illustrates further functions in terms of address translation and memory protection.

The apparatus of FIG. 2 comprises a CPU 200, a GPU 210, a display processor 220, an interconnect 230 and a memory 240. The GPU 210 and the display processor 220 are examples of a media processor as discussed above with reference to FIG. 1.

The memory 240, which may be embodied as one or more physical memory devices, can store various types of data including, for example, program code for execution by the CPU, GPU or display processor, and media data such as video data. An example situation is one in which a pre-prepared video programme is to be replayed by the GPU and/or display processor. Here, there are various constraints on the stored video data. One constraint is that of security, in which the stored video data may be protected by copyright and digital rights management (DRM) systems to avoid unlawful copying of the data. Another constraint is the need for real-time or at least rapid and prompt access to the video data so as to avoid interruptions in the real-time replay and display of the video content. A further constraint can be that the quantity of data is potentially very large, particularly if high definition material is being displayed.

Considering security, the nature of the protected content could be such that stage-two translation (which the operating system does not have control over) is appropriate. However, memory protection is also an appropriate means of protecting such content. But as discussed above, the quantity of data may be such that even if the data is held at a contiguous range of virtual addresses in the virtual address space, this may well be mapped by the address translation process to non contiguous areas in the physical address space, simply because a large contiguous area of physical memory may not be available during normal operation of the apparatus. An MPU as discussed above operates on the slave side and with respect to the physical address space. Therefore, the use of such an MPU to provide protection for a large but non-contiguous area of the physical address space for storage of video data can be problematic because of the potentially large number of non-contiguous physical address regions. A previously proposed solution, which was to reserve or "carve out" a physical memory area at boot of the system, would mean that the operating system had less memory with which to work from the outset of operations.

The present examples can provide a memory protection and address translation function at the master side of the interconnected system of FIG. 2.

In FIG. 2, address translation is carried out by a memory management unit (MMU) 205 forming part of the functionality of the CPU 200, and by MMUs 250, 260 operating in respect of the GPU and display processor respectively.

Each of the MMUs 250, 260 includes permission circuitry, which may otherwise be referred to as a protection cache (P$) 252, 262. The operation of the permission circuitry will be discussed in detail below. The permission circuitry arrangement can provide functionality relating to address translation and master-side memory protection.

Figure 3:
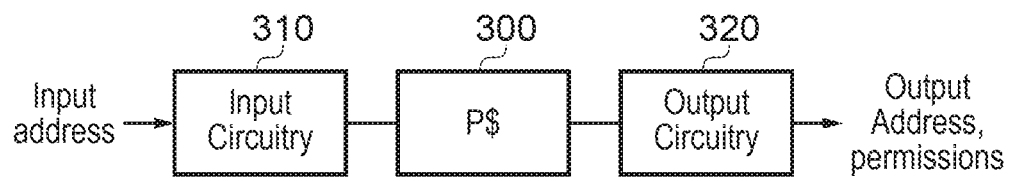
FIGS. 3 to 5 schematically illustrate examples of address translation apparatus.
Figure 4:
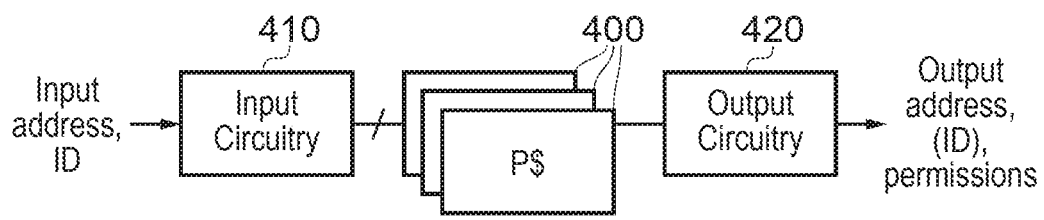
Figure 5:
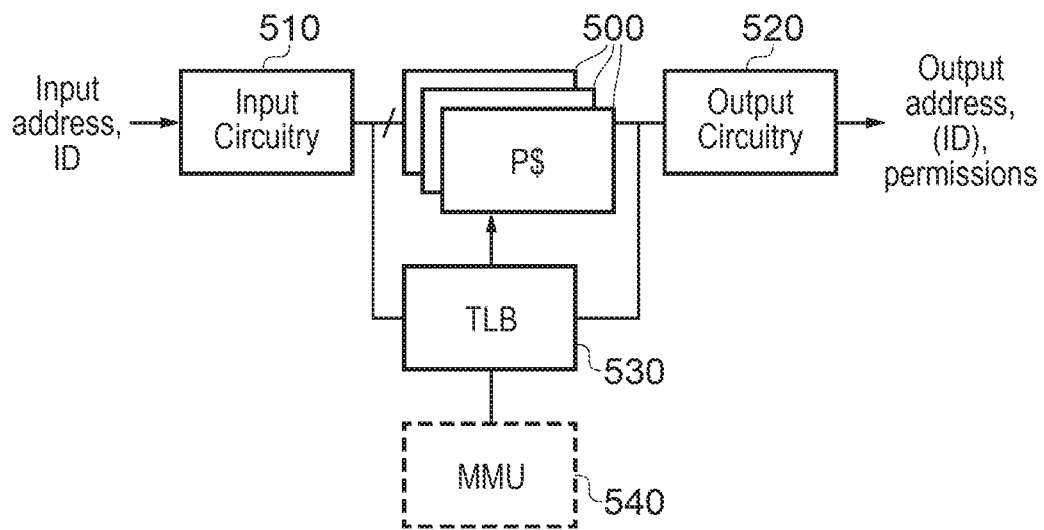

FIGS. 3-5 schematically illustrate examples of address translation apparatus of the type embodied by the MMU 250 or the MMU 260. In each case, an input to the apparatus is an input memory address received from the respective data processing node (the GPU or the display processor in this example) for which a translation is requested. An output of the apparatus is an output address, being a translated version of the input address, assuming that permission is available for the requested memory access.

A first example is illustrated schematically in FIG. 3.

The arrangement of FIG. 3 includes permission circuitry 300 which, in examples, can be a relatively small memory which stores permission information relating to blocks of addresses within the address space of the input address provided to the apparatus. Even in a large memory space system, the features to be discussed below can allow the amount of memory storage required by the permission circuitry to be relatively small such that in some examples the memory can be implemented locally to the data processing node for which address translation is being carried out. This can avoid the need to make reference to the main memory 240 for address translation, and provide potentially a faster operation.

For example, the available memory space may be divided into blocks of (for example) 2 MB, for the purposes of the operation of the permission circuitry. This means that if one entry in the permission circuitry is provided for each such block, in the example case of an 8 GB memory space, 4096 entries are required. In an example, two data bits are provided for each entry which means that the size of the permission circuitry 300 can be 8192 bits in the example 8 GB memory space system. A memory of this general size can be sufficiently small to be implemented locally to the device which is accessing it.

In examples, the whole of the available memory space is mapped to respective entries in the permission circuitry 300. The mapping is such that the available memory space is divided (for example) for these purposes into blocks of a particular size such as 2 MB, and each block mapped to a separate respective entry in the permission circuitry 300. In this way, there is a dedicated entry in the data stored by the permission circuitry for each of the blocks or regions of the input memory address space. This provides an example in which the permission circuitry is configured to store permission data for a set of contiguous regions of the input memory address space, such that each possible input memory address of the input memory address space is within a respective one of the regions.

Note that the storage of data in the permission circuitry does not need to extend across the whole possible address space of the input memory address. The operation of the permission circuitry could be restricted to a subset of that memory address space but in such a predetermined manner that there is still a dedicated entry in the data stored in the permission circuitry 300 for each block of the address space with which it is concerned. In this way, the operation of the permission circuitry differs from, for example, a translation lookaside buffer (TLB) in which tags or similar indications have to be used to annotate the data stored in the TLB so as to indicate which memory address the stored data relates to. In the permission circuitry 300, across an input memory address space, entries are provided for each of the respective blocks in such a way that the entries are dedicated to blocks of those addresses.

In operation, the input circuitry 310 receives an input address and maps that address to a particular entry in the permission circuitry 300.

The permission circuitry entries indicate, in this example, permissions such as read permissions and write permissions (a read and write permission can be represented by two bits as discussed above). The permission circuitry entries do not indicate a mapping in the sense that, for example, a page table would (page tables will be discussed further below), but instead a predetermined mapping is used. Output circuitry 320 detects the contents of the permission circuitry 300 relating to the current input address and, assuming that access is provided by the data stored in the permission circuitry for the current address (in fact, the whole block encompassing the current address) the output circuitry 320 generates an output address as a predetermined mapping of the input address and provides this as an output signal along with the permission indications.

The predetermined mapping could be as simple as:
input address=output address
Or in other examples, a predetermined offset could be applied between the two addresses so that, for example:
output address=input address+offset
By using the predetermined mapping, it is not necessary for the permission circuitry to store mapping information itself in the way a TLB would store mapping information. Once again, this can provide for a compact and fast operation of the permission circuitry.

Figure 6:
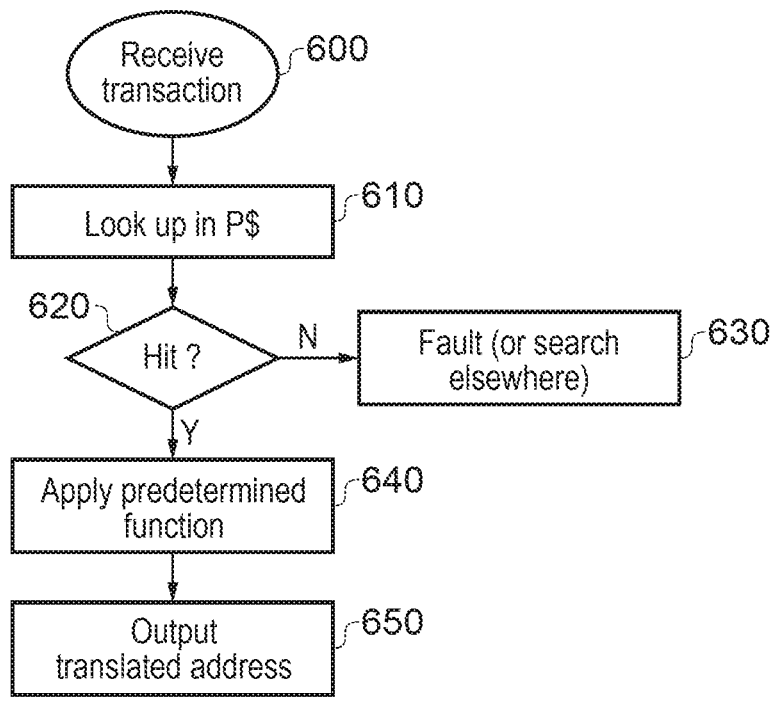
FIG. 6 is a schematic flowchart illustrating operations of the apparatus of FIG. 3.

These operations relating to the arrangement of FIG. 3 are illustrated in a schematic flowchart in FIG. 6.

At a step 600, a memory access transaction including the input address is received by the input circuitry 310. At a step 610, the input address is looked up in the permission circuitry and at a step 620, a detection is made as to whether a hit has been obtained in the permission circuitry. Here, the term "hit" can refer to detecting whether the input address relates to a region or block covered by the permission circuitry but, in example arrangements in which the whole available input memory space is covered by the permission circuitry, the determination of a "hit" at the step 620 can be a detection of whether access permission is provided by the permission circuitry for a memory access at a block encompassing that input address. So, in this example, the permission circuitry either stores no permissions (not a hit) or some sort of permission such as read-only, write-only or read/write in which case a "hit" is detected.

If a hit is not detected, control passes to a step 630 at which either a fault condition is returned or, as discussed below with reference to other example embodiments, a search for an address translation is carried out elsewhere.

If, however, a hit is detected then control passes to a step 640 at which the output circuitry 320 applies the predetermined translation function (which may be equality as discussed above) to the input address and, at a step 650, outputs the translated address along with the permission indications.

FIG. 4 schematically illustrates another example of address translation apparatus. In many respects this operates in a similar manner to that shown in FIG. 3, and description which is common to both arrangements will not be repeated. Differences between the arrangements of FIG. 3 and FIG. 4 are: the use of an identifier (ID) as part of the input transaction, and the use of multiple versions of the data stored in the permission circuitry, selectable according to the ID.

The ID can indicate, at least in part, the provenance of an address translation transaction, and in some examples can do this by indicating a level of trust associated with the software which generated the transaction. Different permissions across the input address space can be associated with different levels of trust. So, a version of the permission data sorted in the permission circuitry is selected according to the input ID associated with a current transaction.

Although the precise layout of the permission circuitry data is not relevant to the present discussion, it can be considered to represent multiple versions of the array of permission data stored by the permission circuitry. These are shown schematically as multiple instances 400 of permission circuitry in FIG. 4. The input circuitry 410 detects both the input address and the ID and, using the ID, selects or enables one version of the permission circuitry data relevant to that ID. The permission data stored at that instance of the permission circuitry data is passed to output circuitry 420 which operates as described earlier, except that, optionally, it can provide the ID as an additional output.

Figure 7:
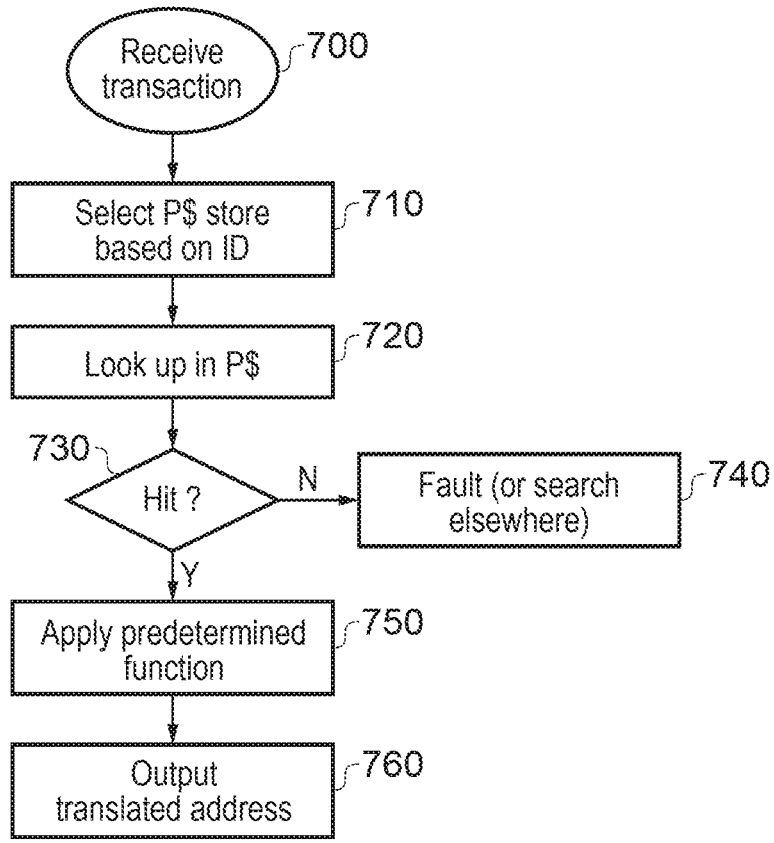
FIG. 7 is a schematic flowchart illustrating operations of the apparatus of FIG. 4.

FIG. 7 is a schematic flow chart illustrating operations of the apparatus of FIG. 4.

Here, many operations are similar or identical to those shown in FIG. 6 and will not be described in detail again. At a step 700, a transaction is received and at a step 710 the input circuitry selects an instance of the permission data stored in permission circuitry 400 based on the ID associated with the received transaction. Using the selected instance of permission circuitry, the process then follows the same course as that shown in FIG. 6, with steps 720, 730, 740, 750 corresponding to the respective steps 610, 620, 630, 640 in FIG. 6. At the step 760 the translated address is output, optionally along with the ID value.

FIG. 5 schematically illustrates a further example of an address translation apparatus. This makes use of the multiple instances 500 of permission circuitry and the ID which is used by the input circuitry 510 to select one of those instances. However, a translation lookaside buffer (TLB) 530 is also provided, optionally in association with an MMU 540 capable, for example, address translation by page table walks. Output circuitry 520 provides the output translated address. The TLB and/or MMU provide an example of second translation circuitry to generate a translation of an input memory address to an output memory address; in which, when the permission circuitry does not indicate that access is permitted to a region of the input memory address space including the input memory address, the output circuitry is configured to provide a translation generated by the second translation circuitry. For example, the second translation circuitry may be configured to perform address translation with reference to the address translation tables. In examples, the second translation circuitry comprises: a translation lookaside buffer (530) to store translations in respect of a subset of input memory addresses in the input memory address space; and circuitry (540) to access the address translation tables to obtain a translation of an input memory address for which a translation is not stored by the translation lookaside buffer.

Figure 8:
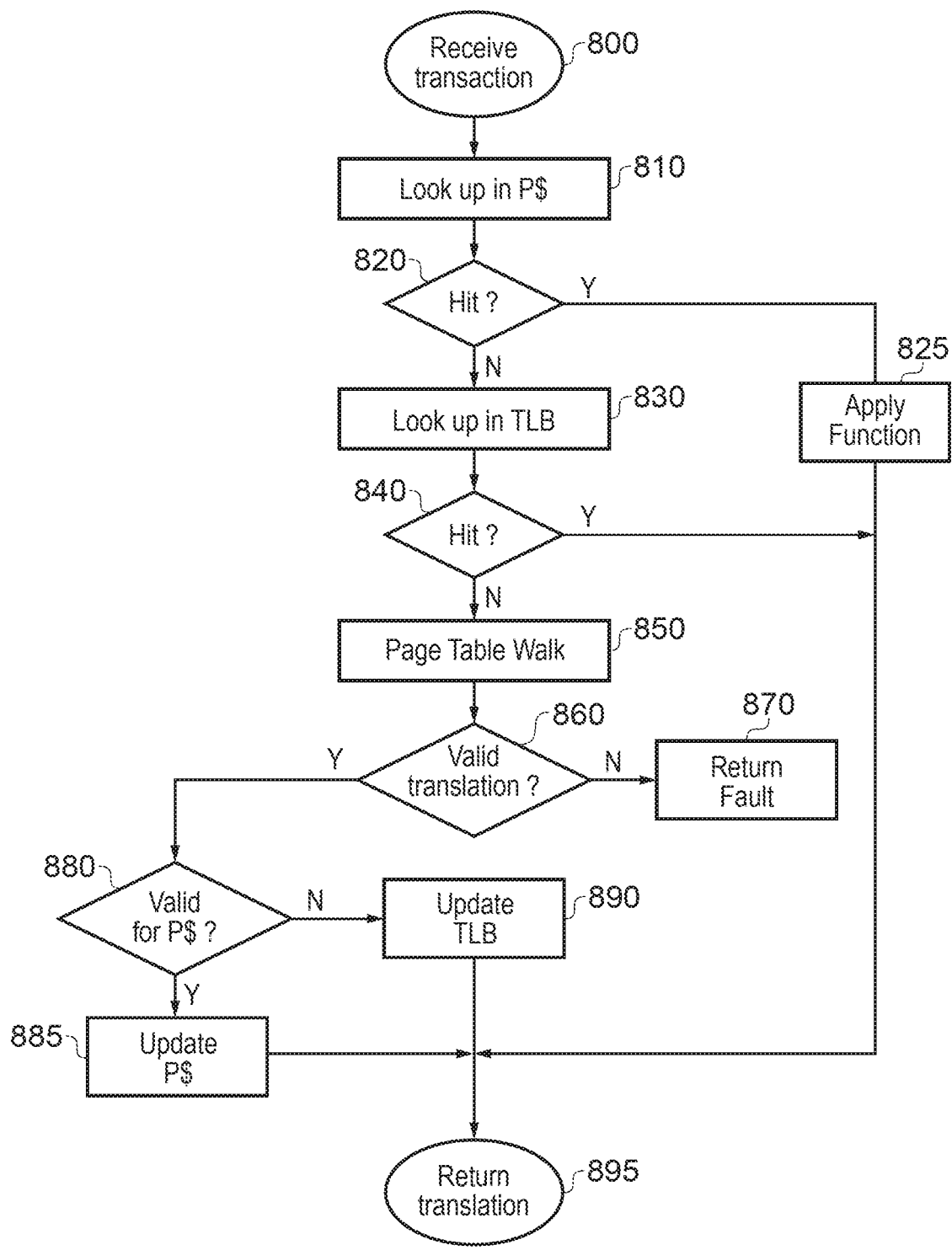
FIG. 8 is a schematic flowchart illustrating operations of the apparatus of FIG. 5.

The operation of the apparatus of FIG. 5 is shown schematically in a flow chart of FIG. 8.

At a step 800, an input transaction is received, and at a step 810, a look-up is performed with respect to the data stored in the permission circuitry 500. This may encompass the selection step 710 discussed above in the case (as shown in the example of FIG. 5) that there are multiple instances of permission circuitry and associated permission data.

A detection is made at a step 820 as to whether a hit has occurred in the permission circuitry data. If a hit has occurred, then control passes to a step 825 (equivalent to the step 750 mentioned above) at which the predetermined function is applied, then to a step 895 at which the translation is returned.

If a hit has not occurred at the step 820, then rather than immediately generating a fault condition, the input address is looked up in the TLB 530 to detect whether a translation for that input address is buffered in the TLB 530. If yes, at a step 840, then the translation is returned at the step 895. If there is not a hit in the TLB, and assuming the MMU 540 is present or otherwise accessible, then the MMU 540 is instructed to perform a page table walk at a step 850. If the MMU 540 is not available or not provided, then a fault may be generated at the "no" output of the step 840.

A step 860 detects whether the result of the page table walk has given rise to a valid translation. If no, then at a step 870 a fault is returned. If yes, then control passes to a step 880.

At the step 880, a detection is made as to whether the translation is a valid translation type for storage in the permission circuitry. That is to say, one or more of the following detections is made:

Does it relate to a block of the block size used by permission circuitry?

Does it relate to permissions which are representable by the data fields provided by permission circuitry?

Does the mapping between the input address and the output address represented by the translation under consideration correspond to the type of mapping representable by the predetermined function associated with permission circuitry?

If the translation is a valid type for storage by permission circuitry, then at a step 885 the permission circuitry is updated according to the newly obtained translation and control passes to the step 895 to return the translation. If however the translation is not of a type which can be validly represented by permission circuitry, then at a step 890 the TLB is updated with the newly obtained translation and the translation is returned at the step 895.

The test at the step 880, and the following steps, therefore provide an example in which when the second translation circuitry generates a translation of an input memory address to an output memory address, the permission circuitry is configured to store permission data for that region of the input memory address space dependent upon the generated translation provided that the translation meets a set of criteria comprising: the translation is valid across the whole of one of the regions of the input memory address space; and the translation is such that output memory addresses are related by the predetermined function to input memory addresses within the region. The set of criteria may also comprise: the translation grants access permissions which correspond to access permissions which can be stored by the permission circuitry.

FIG. 2, including the arrangement of any one of FIGS. 3 to 5, therefore provides an example of apparatus comprising: input circuitry (310, 410, 510) to receive a translation request defining an input memory address within an input memory address space; and address translation circuitry comprising:

permission circuitry (300, 400, 500) to detect whether memory access is permitted for the input memory address with reference to permission data populated from address translation tables and stored in a permission data store for each of a set of respective regions of the input memory address space, there being a dedicated entry in the permission data store for each of the regions so that the input memory address maps to a single respective entry; and output circuitry (320, 420, 520) to provide an output memory address in response to the translation request, in which when the permission circuitry indicates that access is permitted to a region of the input memory address space including the input memory address, the output circuitry is configured to provide the output memory address as a predetermined function of the input memory address.

The predetermined function may be such that the output memory address is equal to the input memory address. The input memory address may be one of a physical address and a virtual memory address, and the output memory address may be a physical memory address.

Figure 9:
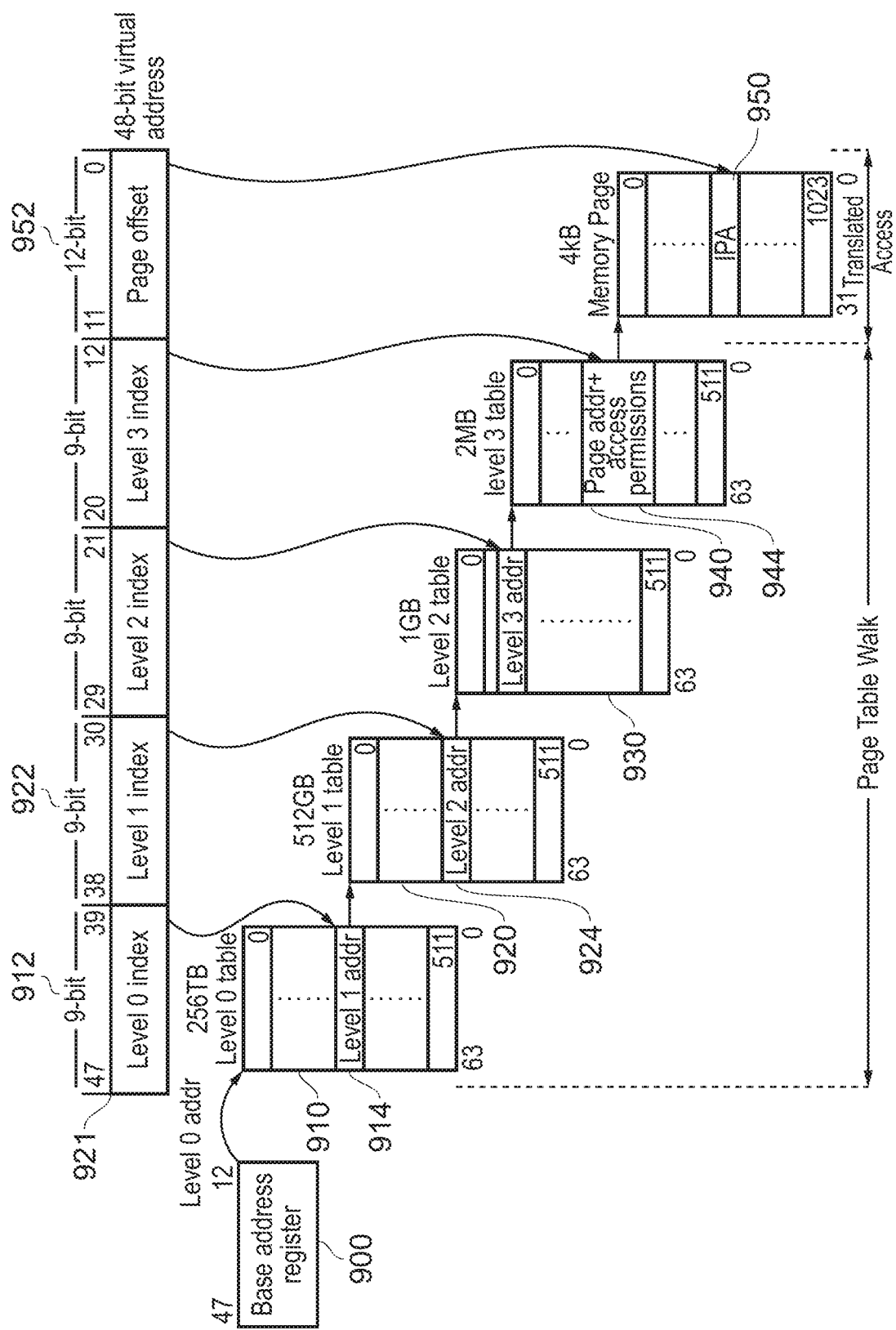
FIG. 9 schematically illustrates a page table.
Figure 10:
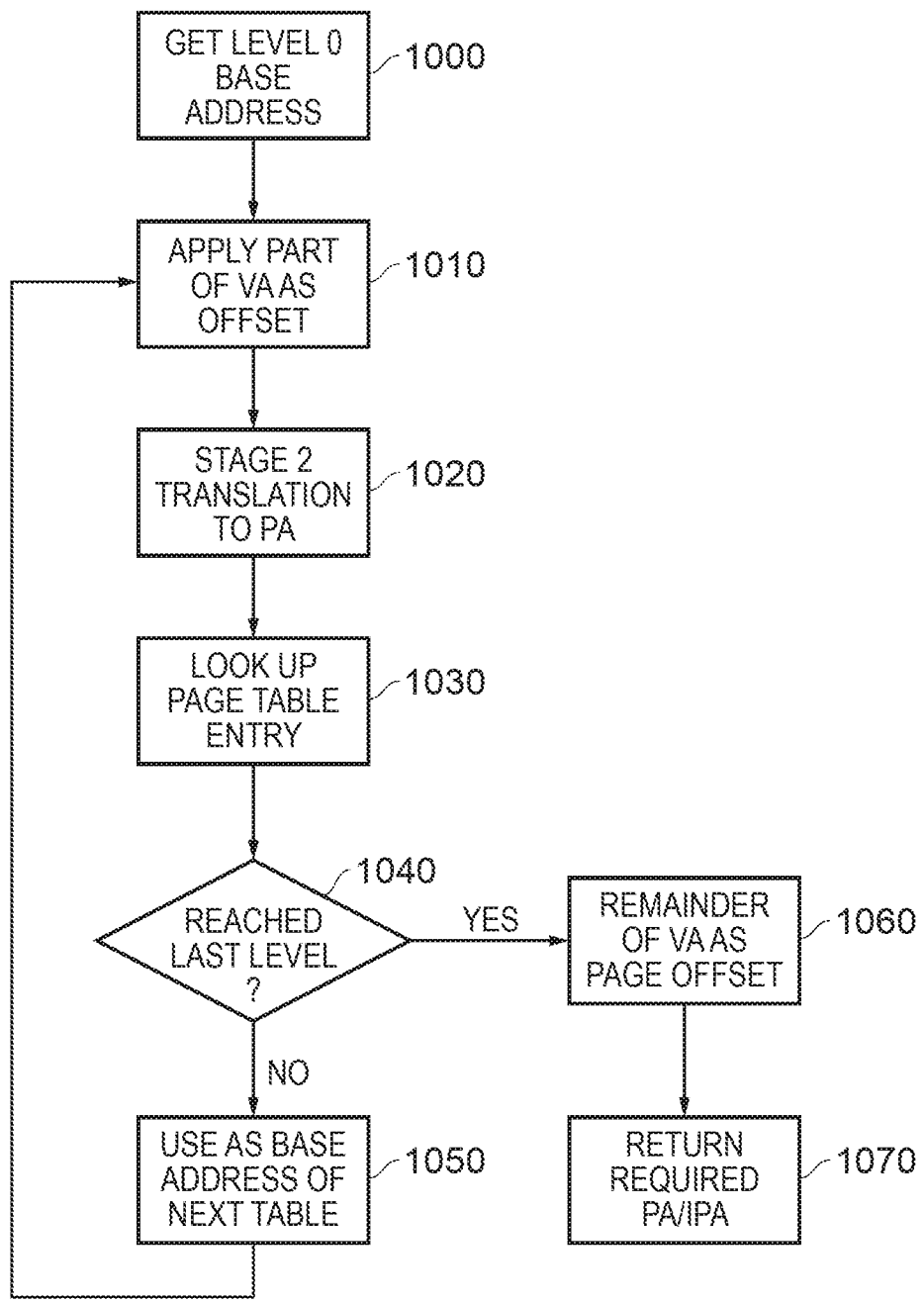
FIG. 10 is a schematic flowchart illustrating a page table walk.

FIG. 9 schematically illustrates an example of a stage 1 page table walk (PTW) process, and FIG. 10 is a schematic flowchart illustrating a PTW process.

The example shown relates to a large (up to 256 TB) memory space. If a smaller memory space is used, one or more lower-numbered "levels" may be omitted from the process as illustrated.

In this example, a VA 921 which requires translation is formed as a 48-bit value. Different portions of the VA 921 are used at different stages in the PTW process.

To obtain a first entry in the page table hierarchy, in a "level 0 table" 910, a base address stored in a base address register 900 (FIG. 9) is obtained at a step 1000 (FIG. 10). A first portion 912 of the VA 921, being in this example the 9 most significant bits, is multiplied by the size represented by each entry in the table and added to the base address as an offset, at a step 1010 so as to provide the IPA 914 of an entry in the table 910. But in order to access the entry 914, a PA indicating the location of the entry 914 in physical memory is needed. Therefore, at a step 1020, the IPA 914 of the page table entry is supplied to the stage 2 translation process for translation into a corresponding PA. When the corresponding PA is received, the relevant page table entry is looked up in physical memory or in a level 2 cache (if the relevant page is cached) at a step 1030.

The skilled person will appreciate that the addresses (such as that held by the base address register and the tables, which are—in at least some examples—set by the operating system) may require stage 2 translation themselves. The stage 2 process applicable to those addresses is used to obtain a PA to look up the table entry. For clarity of the diagram, the stage 2 processes are not shown in FIG. 9.

At a step 1040, a detection is made as to whether a last level has been reached in the page table hierarchy. the last level could be level 3 in the hierarchy, but it is possible for page table entries at higher levels in the hierarchy to indicate, rather than a base address of a next page table entry in the hierarchy, a translation for an entire memory block. If this situation arises, the PTW process is considered complete and that level is treated (for the purposes of the step 1040) as the "last level". For example, if the level 2 table as drawn indicated such a translation, this translation would apply to a 2 MB block of memory addresses and the step 1040 would detect that this is the "last level".

If the outcome of the step 1040 is negative, control passes to a step 1050 at which the retrieved page table entry is used as a base address of a next table in the hierarchy. The page table entry corresponding to the IPA 914 therefore provides a base address to the next level table in the hierarchy, a "level 1 table" 920. Control returns to the step 1010.

At the second iteration of the step 1010, a further part 922 of the VA 921, being the next 9 bits [38:30] of the VA 921, forms an offset from the base address of the table 920 in order to provide the IPA of an entry 924 in the table 920. Once again, this IPA is subjected to stage 2 translation to provide a PA which can be looked up to obtain the base address of a "level 2 table" 930 which in turn (by the same process) provides the base address of a "level 3 table" 940.

When the steps 1030 and 1040 are carried out in respect of a page table entry defined by an IPA 944 in the table 940, the answer to the detection at the step 1040 is "yes". The page table entry indicated by the IPA 944 provides a page address and access permissions relating to a physical memory page. The remaining portion 952 of the VA 921, namely the least significant 12 bits [11:0] provides a page offset within the memory page defined by the page table entry at the IPA 944, though in an example system which stores information as successive four byte (for example 32 bit) portions, it may be that the portion [11:2] provides the required offset to the address of the appropriate 32 bit word. Therefore, the combination (at a step 1060) of the least significant portion of the VA 921 and the final page table entry (in this case, from the "level 3 table" 940) provides (at a step 1070) the IPA 950 as a translation of the VA 921. Note that a PTW process as described here returns an IPA in respect of the PTW carried out by the stage 1 address translation and returns a PA in respect of the PTW carried out by the stage 2 address translation.

Note also that the techniques discussed in respect of FIGS. 3 to 8 can be used in respect of the stage 1 translation alone, the stage 2 translation alone, and/or the combination of stage 1 and stage 2 translation.

FIG. 9 therefore provides an example in which address translation tables comprise a hierarchy of two or more page table levels, in which a page table in a higher level indicates, for a block of input memory addresses having a block size associated with that page table level, either: a respective one of a set or two or more page tables in a next level; or an address mapping applicable to that block of input memory addresses. The regions (for which permission data is stored by the permission circuitry) may have a region size (such as 2 MB) equal to the block size associated with one of the page table levels other than a lowest page table level in the hierarchy of page table levels.

Figure 11:
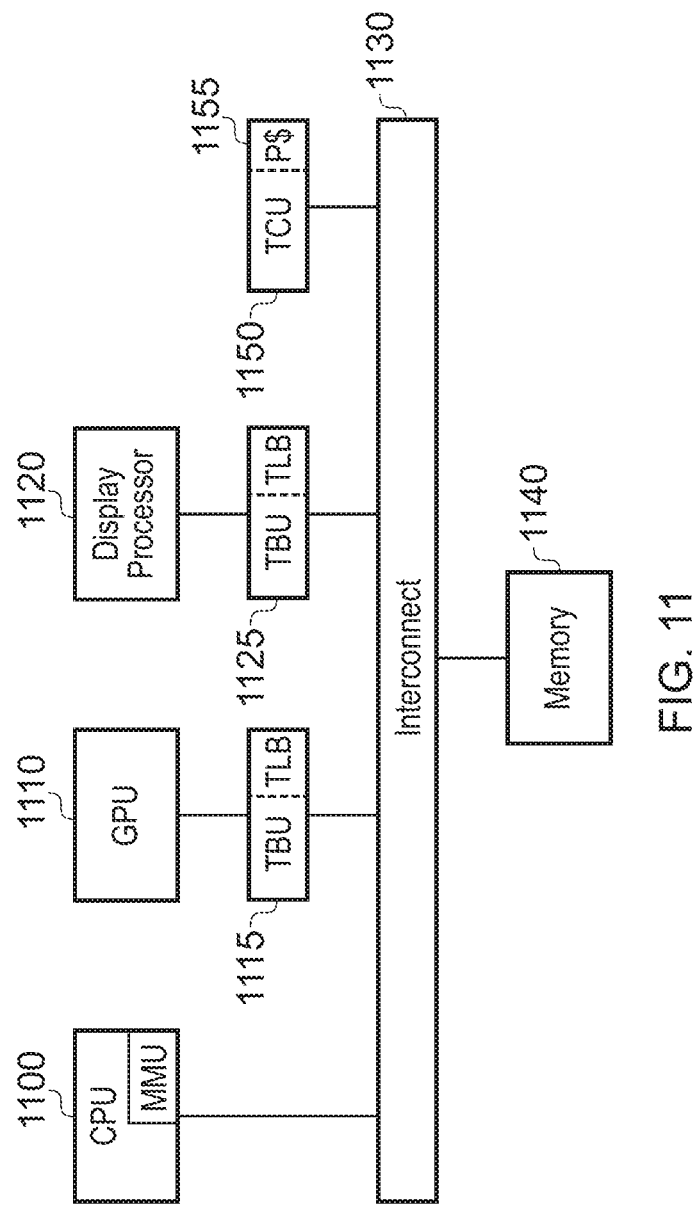
FIG. 11 schematically illustrates a data processing apparatus.

FIG. 11 schematically illustrates a data processing apparatus using a different arrangement of address translation. Here, a CPU 1100, a GPU 1110 and a display processor 1120 form examples of data processing nodes connected to an interconnect 1130 to which a memory 1140 is also connected.

Address translation for the GPU and display processor is carried out by a TBU (translation buffer unit) 1115, 1125 respectively, each of which includes a TLB. A separate translation control unit (TCU) 1150 including an instance of permission circuitry 1155 is connected to the interconnect 1130.

Figure 12:
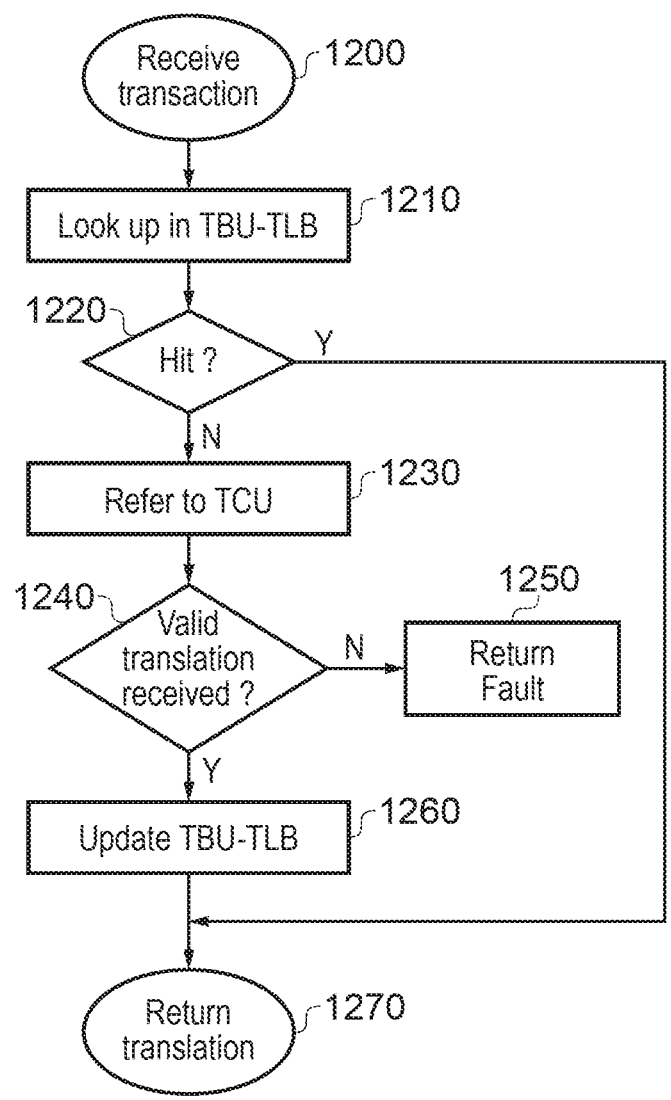
FIG. 12 is a schematic flowchart illustrating operations of the apparatus of FIG. 11.

FIG. 12 is a schematic flowchart illustrating operations of the apparatus of FIG. 11.

At a step 1200, the TBU 1115, 1125 receives a transaction from the GPU or display processor respectively. At a step 1210, the TBU looks up the input address in its own TLB. If there is a hit (at a step 1220) indicating that the translation was buffered in the TBU-TLB then control passes to a step 1270 at which the translation is returned.

If there is not a hit at the step 1220 then control passes to the step 1230 at which the translation is referred as a transaction to the TCU. The TCU operates according to any one of the flowcharts of FIGS. 6 to 8, but in this example, it follows the flow chart of FIG. 8 (referring to the circuitry of FIG. 5) such that it carries out a check within its permission circuitry, then a check within its own TLB and then a page table walk to establish a translation. It returns either a valid translation or a fault condition.

At a step 1240, a detection is made as to whether a valid translation has been received from the TCU. If no, then a fault condition is returned at a step 1250. If yes then the TBU-TLB is updated with the translation at a step 1260 and the translation is returned at the step 1270.

The population of the permission data in the permission circuitry will now be discussed further with reference to FIGS. 13-15.

FIG. 13 is a simplified representation of the data processing apparatus discussed above, in which a CPU 1300 runs program code to implement a supervising processor 1305 to control storage of the address translation tables and to write permission data to the permission circuitry in dependence upon the address translation tables. This supervising processor writes page tables (as discussed above) to the memory 1340. A direct dotted line is shown for this data transfer but in physical terms the data is handled via the interconnect 1330 as normal.

The supervising processor also writes initial permission data to the permission circuitry, where the permission data is derived from the page table data.

With reference to the discussion of the PTW process above, it was indicated that the page tables can provide translations for blocks of memory addresses which may, in examples, be larger than the smallest granularity block of the system. In other words, a page table level other than the lowest level of the hierarchy can indicate, instead of a base address of a next level page table in the hierarchy, a translation applicable to a particular block size. In the example of FIG. 9, a level 2 table entry could indicate an address translation applicable to a 2 MB block of memory addresses.

The supervising processor derives the page tables and, in dependence upon the page table entries which (as discussed above) provide address translations and permissions for blocks of the size used by the permission circuitry, derives data to be stored at the appropriate location (for that address range) in the permission circuitry. If, for a particular memory region, the page tables define address translations at a smaller granularity, then the relevant entries in eth permission circuitry for those regions can be set to "no permission", forcing the translations to be obtained by mechanisms other than from the permission circuitry (for example via the "no" outcome of the step 820).

As discussed above, another route to populate and/or update the permission circuitry data is during operation, for example as represented by the step 1885 in FIG. 8, with this route being shown by a schematic broken line arrow 1350.

FIG. 14 is a schematic flowchart illustrating the populating of page tables and permission information. This can be carried out, for example, at boot of the apparatus or at intervals or occasions after that or both.

At a step 1400, the supervising processor 1305 derives the page tables.

Control then passes two steps 1410, 1430.

At the step 1410, permission data is derived from the page table data and, at a step 1420 is stored to the permission circuitry storage.

The step 1430 concerns the storage of the page tables in the memory 1340.

FIG. 15 is a schematic flowchart illustrating the processing of a change to a page table.

At a step 1500, the supervising processor 1305 initiates a change to one or more of the page tables.

At a step 1510, the supervising processor issues an invalidation signal to the TLB and/or permission circuitry entries concerning the translations covered by the changes to the page tables.

At a step 1520, the supervising processor can optionally repopulate the permission circuitry entries according to the newly established page tables using the method of FIG. 14.

Figure 16:
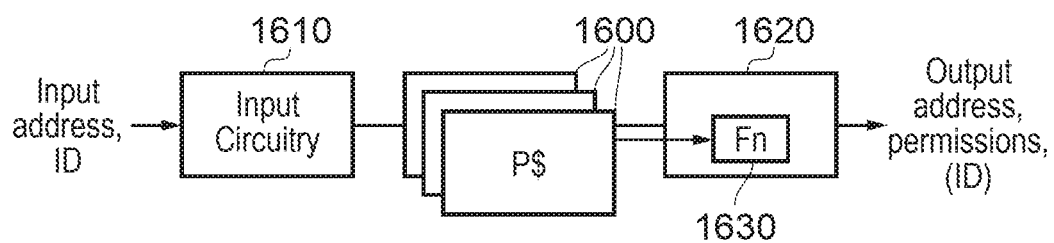
FIG. 16 schematically illustrates an address translation apparatus.

FIG. 16 schematically illustrates an address translation apparatus similar to that shown in FIGS. 3-5 and using multiple instances 1600 of the permission circuitry data according to an ID receives by the input circuitry 1610. In this example, the permission circuitry is configured to store data identifying the predetermined function.

A difference between FIG. 16 and the arrangements described earlier is that the predetermined function (as between the input address and the output address, which in this instance is implemented by circuitry 1630 of the output circuitry 1620) is selectable as between two or more such predetermined functions. The selection is provided to the function circuitry 1630 and the appropriate function is implemented by that circuitry.

Examples of ways in which the predetermined function can be stored and implemented are described with reference to FIGS. 17 and 18 which represent example data structures associated with the permission circuitry storage.

Figure 17:
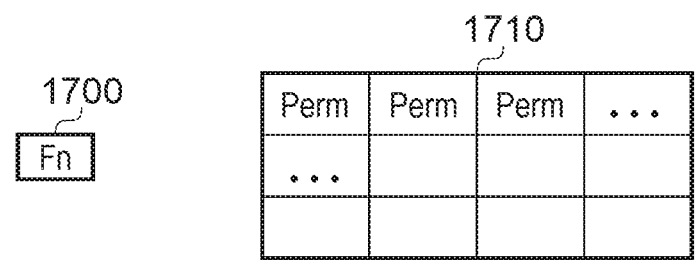
FIGS. 17 and 18 schematically illustrate example data structures.
Figure 18:
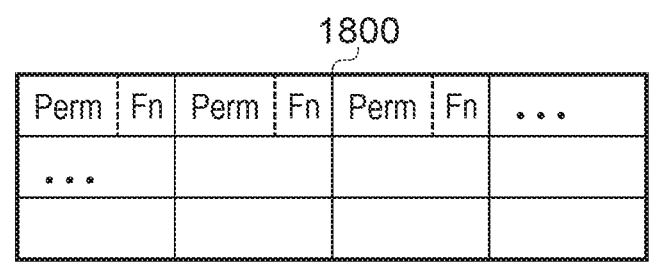

FIG. 17 provides a single instance of the storage of data defining a function to be applied by the function circuitry 1630 in a data field 1700 along with an array of permission data 1710, one set of permission data for each block of the input address space. This arrangement can be repeated for each instance of permission circuitry, so that a different predetermined function can be selected for each instance of permission circuitry in this way.

As an alternative, each data field for each block (or alternatively, though not shown in this example, by a group of blocks) 1800 can include a definition of the appropriate function to use for mapping that block along with the permissions associated with that block.

As discussed above, example functions include equality and the addition of an offset.

Figure 19:
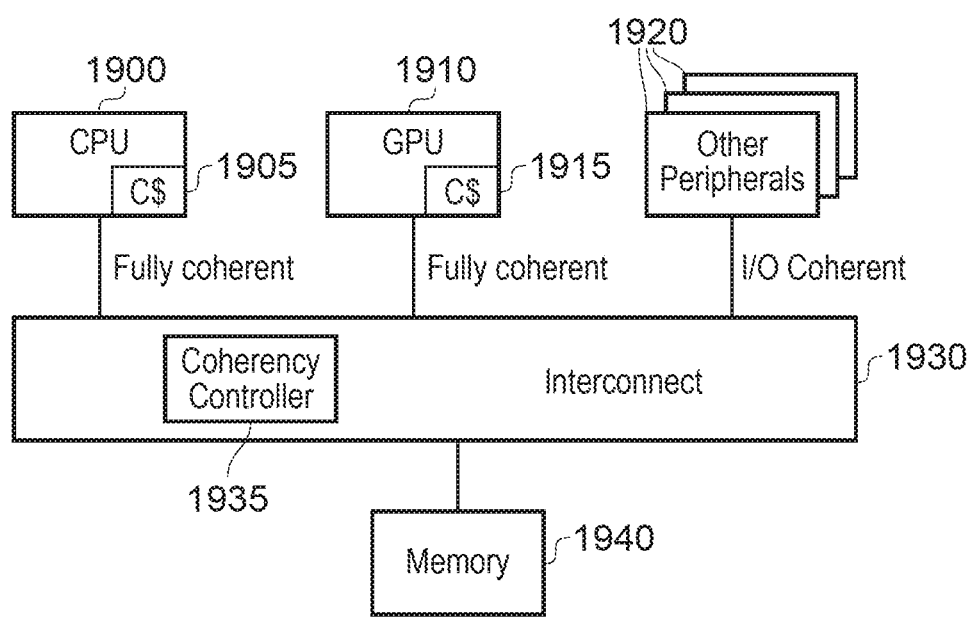
FIG. 19 schematically illustrates a coherent data processing apparatus.

FIG. 19 schematically illustrates another example of data processing circuitry comprising a CPU 1900, a GPU 1910, other peripherals 1920, an interconnect 1930 and a main memory 1940. This provides an example of a data processing apparatus comprising: one or more memories accessible according to physical memory addresses; one or more data processing nodes to generate translation requests from a virtual memory address generated by that data processing node to a physical memory address to access the one or more memories; and address translation apparatus comprising apparatus as discussed above to translate a virtual address from a data processing node to a physical address to access the one or more memories.

In example embodiments, the interconnect circuitry 1930 may be an example of so-called cache coherent interconnect circuitry, including or being connectable to a coherency controller 1935. Here, the term "coherent" refers to the maintenance of a correct relationship between multiple copies of the same data stored across the whole system. For example, data may be stored in a cache memory device 1905, 1915 by one of the data processing nodes (such as the CPU or GPU). Other data processing nodes may have their own respective caches 1915, 1905 which, depending on the nature of the processing operations, may store one or more copies of data which is also held in the cache memory 1905, 1915. Therefore, in these examples, the one or more data processing nodes have respective associated cache storage; the data processing apparatus comprises coherency control circuitry; and the one or more memories and the cache storage are configured to operate under the control of the coherency control circuitry to store one or more copies of data accessible by each of the data processing nodes, so that data written to a memory address in the coherent memory circuitry by one processing element is consistent with data read from that memory address in the coherent memory circuitry by another of the processing elements.

In the case of a data handling access by one node to such information, there is a need to ensure that the accessing node is accessing the latest version of the stored information, and that if it makes any alteration to the stored information, either the other versions are correctly altered themselves or the other versions are deleted or invalidated. In general terms, the cache memories 1905, 1915 and the coherency controller 1935 provide coherent memory circuitry storing one or more copies of data accessible by each of the processing elements (for example, each of the processing elements connected via the interconnect circuitry 1930), so that data written to a memory address in the coherent memory circuitry by one processing element is consistent with data read from that memory address in the coherent memory circuitry by another of the processing elements.

The role of logic associated with the cache coherence function is therefore to ensure that before a data handling transaction takes place, if the version of the data item to be accessed is out of date (because of a modification made to another copy of the same data item), the copy to be accessed is first brought up to date. Similarly, if the data handling transaction involves modifying a data item, then cache coherence logic avoids conflicts with other existing copies of the data item. Techniques for achieving this can include (for example) the use of a so-called "snoop filter".

The term "snoop filter" is a historical one and is used here to refer to a control device forming part of the coherency controller 1935 having an associated "directory", where the directory stores information indicating which data is stored in which cache, and the snoop filter itself at least contributes to the handling of data accesses to cached information so as to provide a cache coherence function.

For example, a snoop filter, having a directory as discussed above and a register indicating those cache memories which are currently part of the coherency control arrangement (otherwise referred to as being in the coherent system or in the coherent domain) forms part of the coherency controller 1935 associated with the interconnect circuitry 1930.

The snoop filter handles at least a part of a process under which, when any of the data processing nodes 1900, 1910 intends to access or modify data which is stored as a cache line in any of the cache memories, that node obtains permission to do so. As part of this process, the snoop filter checks whether any other cache memories have a copy of the line which is to be modified. If any other copies are in existence at other cache memories, then those copies need to be cleared and invalidated. If those copies themselves contain modifications to the stored data in that line, then in at least some circumstances, the coherency controller 1935 (or the snoop filter itself) instructs the cache memory to write that line back to main memory. This provides an example of the coherency control circuitry being configured to communicate with the cache storage in respect of data held by the cache storage using a physical memory address by which that data is stored in the one or more memories. This is made possible by the feature that the predetermined function used for address translation in this example is equality.

In the case of a read access by a node with respect to data stored in a cache memory, it is important that the node 1900, 1910 requesting the read has access to the latest correct version of the cached data. The coherency controller 1935 oversees this process so that if another cache has a recently-modified version of the required data, that other cache writes back the modified version and/or forwards a copy of the modified version for caching at the currently requesting node.

The coherency controller 1935 including the snoop filter therefore provides an example of a cache coherency controller configured to coordinate, amongst the cache memories, an access to a memory address by one of the cache memories when the directory indicates that another of the cache memories is caching that memory address. The snoop filter stores or provides a directory such as the directory mentioned above indicating, for memory addresses cached by one or more of a group of one or more cache memories connectable in a coherent cache structure, which of the cache memories are caching those memory addresses.

In FIG. 19, the CPU and GPU are referred to as "fully coherent" whereas the other peripherals are referred to as "I/O coherent" (where I/O is an abbreviation of "input/output"). A difference is that the CPU and GPU maintain their own coherent cache storage of at least some data items, whereas the other peripherals do not. Therefore the other (I/O coherent) peripherals have a requirement for coherency during data read or write operations, while the fully coherent CPU and GPU have a requirement for coherency relating to their own cached copies of at least some data items.

Consider now the interaction of the coherency techniques just described with memory address translation (whether of the type discussed above with reference to FIGS. 2 to 18, or more generally).

Enquiries (such as snoops) made by the coherency controller 1935, as part of its operation to maintain coherency across the system, relate to physically addressed memory. However, the CPU and GPU operate according to virtual memory addresses. Generally speaking, address translation is provided for transactions originating at a master device (such as the CPU or GPU) rather than for transactions, such as snoops, directed towards a fully coherent master device. Although the whole address translation structure could be duplicated in order to work in the "other" direction, this could lead to an increase in hardware or processing requirements.

In the following discussion, four types of data handling transaction are considered:

(a) a non-cache allocating transaction such as a non-coherent read or write, a non-caching read or write, or an I/O coherent read or write. In this type of transaction, the contents of a CPU or GPU cache are not read or altered;

(b) a cache allocating transaction such as a cachable coherent read from memory or a fetch invalid operation (such as a make invalid operation or a clean invalid operation). In this type of transaction, the contents of a CPU or GPU cache (in the present example) are potentially altered;

(c) a cachable coherent write, which is to say a write to memory from a coherent cache; and (d) a snoop operation directed towards a fully coherent master device.

These transaction types are handled in example arrangements as follows:

(a) This type of transaction is handled using address translation as normal, which is to say, an MMU or the like (or an arrangement including permission circuitry as discussed above) can be used for address translation;

(b) Here, in the present examples, permission circuitry as discussed above is used, with the predetermined function as discussed above being that the input address is equal to the output address (across all stages of translation, if multiple stages are used). The use of the equality function means that the translation is valid in either direction. Full read/write permission is given by the permission circuitry in the example arrangements.

(c) Noting that these transactions are only possible if the system has already successfully performed a transaction of the type (b), this type of transaction is always allowed.

(d) These transactions are always allowed. The constraint on the use of the equality function in the discussion of (b) means that the address provided by the snoop circuitry will be the appropriate address for a snoop operation to the appropriate cache.

Figure 20:
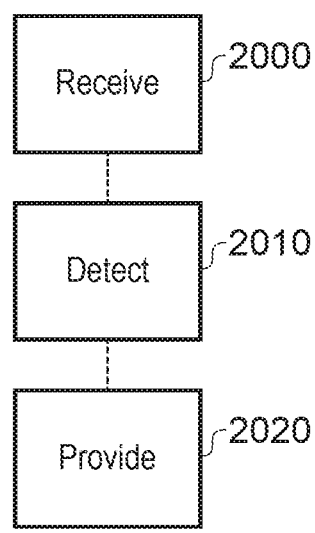
FIGS. 20 and 21 are schematic flowcharts illustrating methods.

FIG. 20 is a schematic flowchart illustrating a method comprising:

receiving (at a step 2000) a translation request defining an input memory address within an input memory address space;

detecting (at a step 2010) whether memory access is permitted for the input memory address with reference to permission data populated from address translation tables and stored in a permission data store for each of a set of respective regions of the input memory address space, there being a dedicated entry in the permission data store for each of the regions so that the input memory address maps to a single respective entry; and providing (at a step 2020) an output memory address in response to the translation request, in which when the permission circuitry indicates that access is permitted to a region of the input memory address space including the input memory address, the output circuitry is configured to provide the output memory address as a predetermined function of the input memory address.

Figure 21:
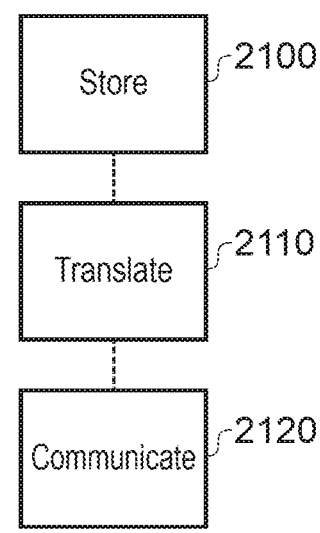

FIG. 21 is a schematic flowchart illustrating a method of operation of a data processing system comprising one or more memories responsive to accesses according to physical memory addresses; one or more data processing nodes to access the one or more memories according to a virtual memory address, the one or more data processing nodes having respective associated cache storage; the method comprising:

coherently storing (at a step 2100) one or more copies of data accessible by each of the data processing nodes, so that data coherently written to a memory address is consistent with data coherently read from that memory address another of the processing elements;

translating (at a step 2110) a virtual memory address generated by a data processing node to an identical physical memory address to access the one or more memories; and a coherency controller communicating (at a step 2120) with the cache storage in respect of data held by the cache storage using a physical memory address by which that data is stored in the one or more memories.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device (such as a processing element as discussed above) may be programmed to perform the function. "Configured to" does not imply that the apparatus element needs to be changed in any way in order to provide the defined operation.

Although illustrative embodiments of the present techniques have been described in detail herein with reference to the accompanying drawings, it is to be understood that the present techniques are not limited to those precise embodiments, and that various changes, additions and modifications can be effected therein by one skilled in the art without departing from the scope and spirit of the techniques as defined by the appended claims. For example, various combinations of the features of the dependent claims could be made with the features of the independent claims without departing from the scope of the present techniques.

The invention claimed is:

1. A method comprising:

receiving a translation request defining an input memory address within an input memory address space;

detecting, by first address translation circuitry, whether memory access is permitted for the input memory address with reference to permission data populated from address translation tables and stored in a permission data store for each of a set of respective regions of the input memory address space, there being a dedicated entry in the permission data store for each of the regions so that the input memory address maps to a single respective entry;

providing an output memory address in response to the translation request, in which when the permission circuitry indicates that access is permitted to a region of the input memory address space including the input memory address, the output circuitry is configured to provide the output memory address as a predetermined function of the input memory address by referencing data identifying the predetermined function in a data field; and generating, by second translation circuitry, a translation of the input memory address to the output memory address by referencing the address translation tables, wherein when access is permitted to a region of the input memory address space including the input memory address, providing the translation generated by the second translation circuitry, wherein the input memory address is one of a physical memory address and a virtual memory address, and the output memory address is a physical memory address.

2. Apparatus comprising:

input circuitry to receive a translation request defining an input memory address within an input memory address space; and first address translation circuitry comprising:

permission circuitry to detect whether memory access is permitted for the input memory address with reference to permission data populated from address translation tables and stored in a permission data store for each of a set of respective regions of the input memory address space, there being a dedicated entry in the permission data store for each of the regions so that the input memory address maps to a single respective entry;

output circuitry to provide an output memory address in response to the translation request, in which when the permission circuitry indicates that access is permitted to a region of the input memory address space including the input memory address, the output circuitry is configured to provide the output memory address as a predetermined function of the input memory address, wherein the permission circuitry is configured to store data identifying the predetermined function in a data field; and second translation circuitry to generate a translation of the input memory address to the output memory address with reference to the address translation tables, wherein when the permission circuitry does not indicate that access is permitted to a region of the input memory address space including the input memory address, the output circuitry is configured to provide the translation generated by the second translation circuitry, wherein the input memory address is one of a physical memory address and a virtual memory address, and the output memory address is a physical memory address.

3. Apparatus according to claim 2, in which the permission circuitry is configured to store permission data for a set of contiguous regions of the input memory address space, such that each possible input memory address of the input memory address space is within a respective one of the regions.

4. Apparatus according to claim 2, in which the second translation circuitry comprises:
a translation lookaside buffer to store translations in respect of a subset of input memory addresses in the input memory address space; and
circuitry to access the address translation tables to obtain the translation of the input memory address when the translation of the input memory address is not stored by the translation lookaside buffer.

5. Apparatus according to claim 4, in which the address translation tables comprise a hierarchy of two or more page table levels, in which a page table in a higher level indicates, for a block of input memory addresses having a block size associated with that page table level, either:
a respective one of a set or two or more page tables in a next level; or
an address mapping applicable to that block of input memory addresses.

6. Apparatus according to claim 5, in which:
the regions have a region size equal to the block size associated with one of the page table levels other than a lowest page table level in the hierarchy of page table levels.

7. Apparatus according to claim 2, in which:
when the second translation circuitry generates a translation of the input memory address to the output memory address, the permission circuitry is configured to store permission data for that region of the input memory address space dependent upon the generated translation provided that the translation meets a set of criteria comprising:
the translation is valid across the whole of one of the regions of the input memory address space; and
the translation is such that output memory addresses are related by the predetermined function to input memory addresses within the region.

8. Apparatus according to claim 7, in which the set of criteria comprises:
the translation grants access permissions which correspond to access permissions which can be stored by the permission circuitry.

9. Apparatus according to claim 2, comprising:
a supervising processor to control storage of the address translation tables and to write permission data to the permission circuitry in dependence upon the address translation tables.

10. Apparatus according to claim 2, in which the predetermined function is such that the output memory address is equal to the input memory address.

11. Data processing apparatus comprising:
one or more memories accessible according to physical memory addresses;
one or more data processing nodes to generate translation requests from a virtual memory address generated by that data processing node to a physical memory address to access the one or more memories; and
address translation apparatus comprising apparatus according to claim 10 to translate a virtual address from a data processing node to a physical address to access the one or more memories.

12. Data processing apparatus comprising:
one or more memories accessible according to physical memory addresses;
one or more data processing nodes to generate translation requests from a virtual memory address generated by that data processing node to a physical memory address to access the one or more memories; and
address translation apparatus comprising apparatus according to claim 2 to translate a virtual address from a data processing node to a physical address to access the one or more memories.

13. Data processing apparatus according to claim 12 in which:
the one or more data processing nodes have respective associated cache storage;
the data processing apparatus comprises coherency control circuitry; and
the one or more memories and the cache storage are configured to operate under the control of the coherency control circuitry to store one or more copies of data accessible by each of the data processing nodes, so that data written to a memory address in the coherent memory circuitry by one processing element is consistent with data read from that memory address in the coherent memory circuitry by another of the processing elements.

14. Data processing apparatus according to claim 13, in which:
the coherency control circuitry is configured to communicate with the cache storage in respect of data held by the cache storage using a physical memory address by which that data is stored in the one or more memories.

15. Data processing apparatus according to claim 14, in which the address translation apparatus is configured to allow a cache allocating read operation from the one or more memories and a cachable coherent write to the one or more memories.

* * * * *